(12) United States Patent
Zhang

(10) Patent No.: US 12,515,726 B2
(45) Date of Patent: Jan. 6, 2026

(54) FOLDING CART

(71) Applicant: Jinhua MFRH Leisure Products Co., Ltd., Jinhua (CN)

(72) Inventor: Xiangshan Zhang, Jinhua (CN)

(73) Assignee: Jinhua MFRH Leisure Products Co., Ltd., Jinhua (CN)

( * ) Notice: Subject to any disclaimer, the term of this patent is extended or adjusted under 35 U.S.C. 154(b) by 353 days.

(21) Appl. No.: 18/308,705

(22) Filed: Apr. 28, 2023

(65) Prior Publication Data

US 2024/0300560 A1 Sep. 12, 2024

(30) Foreign Application Priority Data

Mar. 6, 2023 (CN) .......................... 202310206035.X
Mar. 6, 2023 (CN) .......................... 202320398336.2

(51) Int. Cl.
*B62B 3/02* (2006.01)
*B62B 3/00* (2006.01)

(52) U.S. Cl.
CPC .............. *B62B 3/022* (2013.01); *B62B 3/001* (2013.01); *B62B 2205/06* (2013.01)

(58) Field of Classification Search
CPC ...... B62B 3/022; B62B 3/001; B62B 2205/06
See application file for complete search history.

(56) References Cited

U.S. PATENT DOCUMENTS 10,435,055 B1 * 10/2019 Zhu .......................... B62B 3/007
2015/0145224 A1 * 5/2015 Zhu .......................... B62B 3/007
280/42

* cited by examiner

*Primary Examiner* — Bryan A Evans
(74) *Attorney, Agent, or Firm* — Bayramoglu Law Offices LLC

(57) ABSTRACT

A folding cart includes a first frame assembly, a second frame assembly, a first folding assembly, and a second folding assembly. The first folding assembly and the second folding assembly are opposite to each other, a first end of the first folding assembly and a first end of the second folding assembly are connected to the first frame assembly, and a second end of the first folding assembly and a second end of the second folding assembly are both connected to the second frame assembly. The first folding assembly and the second folding assembly can be switched between a first state and a second state.

7 Claims, 7 Drawing Sheets

FOLDING CART

CROSS REFERENCE TO THE RELATED APPLICATIONS

This application is based upon and claims priority to Chinese Patent Application No. 202310206035.X, filed on Mar. 6, 2023, and Chinese Patent Application No. 202320398336.2, filed on Mar. 6, 2023, the entire contents of which are incorporated herein by reference.

TECHNICAL FIELD

The present disclosure relates to the technical field of carts, and in particular, to a folding cart.

BACKGROUND

In daily life and production, it is often necessary to carry luggage or articles, and carts are often used in this process. Carts are widely used to carry things because they can be pushed easily and save time and efforts. Many carts now use a flat plate, with wheels mounted under the flat plate for consignment. This kind of cart cannot be folded, and thus takes up a lot of space when it is not in use and is inconvenient to carry.

At present, there are some foldable carts. However, these foldable carts have a limited volume and are still too large after being folded.

SUMMARY

(I) Technical Problems to be Solved

To overcome the above shortcomings of the prior art, the present disclosure provides a folding cart, which solves the technical problems that the foldable cart is too large after being folded and the volume of the foldable cart is small.

(II) Technical Solutions

To achieve the above objective, the folding cart of the present disclosure includes:
  a first frame assembly, a second frame assembly, a first folding assembly, a second folding assembly, and a bottom support assembly; the first frame assembly and the second frame assembly are arranged oppositely, a first end of the first folding assembly and a first end of the second folding assembly are both connected to the first frame assembly, a second end of the first folding assembly and a second end of the second folding assembly are both connected to the second frame assembly, and two ends of the bottom support assembly are connected to the first frame assembly and the second frame assembly in one-to-one correspondence;
  the first folding assembly and the second folding assembly are capable of being switched between a first state and a second state;
  in the first state, the first frame assembly and the second frame assembly are close to each other, the first folding assembly and the second folding assembly are both folded and compressed between the first frame assembly and the second frame assembly, the bottom support assembly is folded between the first frame assembly and the second frame assembly, and heights of the bottom support assembly, the first folding assembly, and the second folding assembly are all smaller than or equal to heights of the first frame assembly and the second frame assembly; and
  in the second state, the first frame assembly and the second frame assembly are away from each other, and the first folding assembly, the second folding assembly, and the bottom support assembly are all stretched and supported between the first frame assembly and the second frame assembly.

Optionally, the first frame assembly and the second frame assembly each include a first vertical bar, a second vertical bar, a first cross bar, and a second cross bar;
  a first end of the first vertical bar is vertically connected to a first end of the first cross bar, a second end of the first cross bar is vertically connected to a first end of the second vertical bar, a second end of the second vertical bar is vertically connected to a second end of the second cross bar, and a first end of the second cross bar is vertically connected to a second end of the first vertical bar; and
  two ends of the first folding assembly are connected to the first vertical bars of the first frame assembly and the second frame assembly in one-to-one correspondence, two ends of the second folding assembly are connected to the second vertical bars of the first frame assembly and the second frame assembly in one-to-one correspondence, and upper end parts of the first folding assembly and the second folding assembly connected to the first vertical bars and the second vertical bars are slidably connected to the vertical bars.

Optionally, the first folding assembly and the second folding assembly each include a first scissor linkage, a third scissor linkage, and a second scissor linkage hinged in sequence;
  the first scissor linkage of the first folding assembly includes a first linkage and a second linkage, and the first scissor linkage of the second folding assembly includes a third linkage and a fourth linkage;
  the second scissor linkage of the first folding assembly includes a fifth linkage and a sixth linkage, and the second scissor linkage of the second folding assembly includes a seventh linkage and an eighth linkage;
  the first linkage is hinged to the first vertical bar of the first frame assembly, a hinged joint is close to a lower end of the first vertical bar of the first frame assembly, and the second linkage is slidably connected to the first vertical bar of the first frame assembly;
  the third linkage is hinged to the second vertical bar of the first frame assembly, a hinged joint is close to a lower end of the second vertical bar of the first frame assembly, and the fourth linkage is slidably connected to the second vertical bar of the first frame assembly;
  the fifth linkage is hinged to the first vertical bar of the second frame assembly, a hinged joint is close to a lower end of the first vertical bar of the second frame assembly, and the sixth linkage is slidably connected to the first vertical bar of the second frame assembly; and
  the seventh linkage is hinged to the second vertical bar of the second frame assembly, a hinged joint is close to a lower end of the second vertical bar of the second frame assembly, and the eighth linkage is slidably connected to the second vertical bar of the second frame assembly.

Optionally, a first slide sleeve is slidably sleeved on the first vertical bar of the first frame assembly, a second slide sleeve is slidably sleeved on the second vertical bar of the first frame assembly, a third slide sleeve is slidably sleeved on the first vertical bar of the second frame assembly, and a fourth slide sleeve is slidably sleeved on the second vertical bar of the second frame assembly; and the second linkage is hinged to the first slide sleeve, the fourth linkage is hinged to the second slide sleeve, the sixth linkage is hinged to the third slide sleeve, and the eighth linkage is hinged to the fourth slide sleeve.

Optionally, the bottom support assembly includes a first bottom frame and a second bottom frame, the first bottom frame is provided with a first side rotatably connected to the first frame assembly and a second side rotatably connected to a first side of the second bottom frame, a second side of the second bottom frame is rotatably connected to the second frame assembly, the first side and the second side of the first bottom frame are opposite to each other, and the first side and the second side of the second bottom frame are opposite to each other;

in the first state, the first bottom frame and the second bottom frame are folded between the first frame assembly and the second frame assembly, and heights of the first bottom frame and the second bottom frame are smaller than or equal to the heights of the first frame assembly and the second frame assembly; and in the second state, the first bottom frame and the second bottom frame are unfolded and supported between the first frame assembly and the second frame assembly, and the first bottom frame and the second bottom frame are located within a same plane.

Optionally, the folding cart further includes a U-shaped boom, a middle of the U-shaped boom is located below a connection point between the first bottom frame and the second bottom frame, a first end of the U-shaped boom is hinged to the first folding assembly, and a second end of the U-shaped boom is hinged to the second folding assembly; and in the second state, the first bottom frame and the second bottom frame both abut against the U-shaped boom.

Optionally, the folding cart further includes a handle assembly, the handle assembly includes a telescopic rod and a pull ring, a first end of the telescopic rod is rotatably connected to the first frame assembly, and the pull ring is connected to a second end of the telescopic rod; and in the first state, the handle assembly is capable of shrinking back to have a height smaller than or equal to the heights of the first frame assembly and the second frame assembly.

Optionally, a plurality of wheel assemblies are connected to the first frame assembly and the second frame assembly.

Optionally, two first wheel assemblies are provided on the first frame assembly, and two second wheel assemblies are provided on the second frame assembly;

the first wheel assemblies each include a universal shaft and a first roller, the universal shaft is rotatably arranged on the first frame assembly, and the first roller is connected to the universal shaft by means of a wheel fork; and the second wheel assemblies are second rollers connected to the second frame assembly by means of wheel forks.

Optionally, the folding cart further includes a cloth container;

the cloth container is sleeved on the first frame assembly, the second frame assembly, the first folding assembly, and the second folding assembly, and the first frame assembly and the second frame assembly are both connected to the cloth container.

(III) Beneficial Effects

The first state in the present disclosure is a folded state. In this state, the first folding assembly and the second folding assembly are both folded and compressed between the first frame assembly and the second frame assembly, and the first frame assembly and the second frame assembly are close to each other. The heights of the first folding assembly and the second folding assembly are smaller than or equal to the height of the first frame assembly, ensuring that the height of the folding cart in a storage state does not exceed the height of the first frame assembly. The folding cart has the same folding height and use height, thereby reducing the volume thereof in the folded state, and facilitating storage and carrying by a user.

The second state is a use state. In this state, the first folding assembly and the second folding assembly are both stretched and supported between the first frame assembly and the second frame assembly, and the first frame assembly and the second frame assembly are away from each other. At this time, the first frame assembly and the second frame assembly are vertically arranged and parallel to each other. By connecting the first frame assembly, the first folding assembly, the second frame assembly, and the second folding assembly into a cart frame, the volume of the cart is effectively increased, and the placement of more articles is facilitated. As shown in FIG. 4, the cart is in a half-folded state, and the half-folded state is an intermediate state between the first state and the second state.

REFERENCE NUMERALS

10: First frame assembly; 20: Second frame assembly; 30: First folding assembly; 40: Second folding assembly; 60: U-shaped boom; 70: Handle assembly; 80: Wheel assembly; 90: Cloth container;

11: First vertical bar; 12; Second vertical bar; 21: First cross bar; 22; Second cross bar;

31: First linkage; 32: Second linkage; 33: Third linkage; 34: Fourth linkage; 35: Fifth linkage; 36: Sixth linkage; 37: Seventh linkage; 38: Eighth linkage;

41 First slide sleeve; 42: Second slide sleeve; 43: Third slide sleeve; 44: Fourth slide sleeve;

50: Bottom support assembly; 51: First bottom frame: 52: Second bottom frame;

71: Telescopic rod; 72: Pull ring;

81: First roller; 82: Second roller; 83: Universal shaft; and 84: Antiskid tread.

DETAILED DESCRIPTION OF THE EMBODIMENTS

To facilitate a better understanding of the present disclosure, the present disclosure is described in detail below with reference to the accompanying drawings and specific embodiments. The terms such as "upper" and "lower" mentioned herein are based on the orientations shown in FIG. 4.

Although the accompanying drawings show exemplary embodiments of the present disclosure, it should be understood that the present disclosure may be implemented in various forms and should not be limited to the embodiments set forth herein. The embodiments are provided for a more thorough understanding of the present disclosure, so as to make the scope of the present disclosure be fully conveyed to those skilled in the art.

Figure 1:
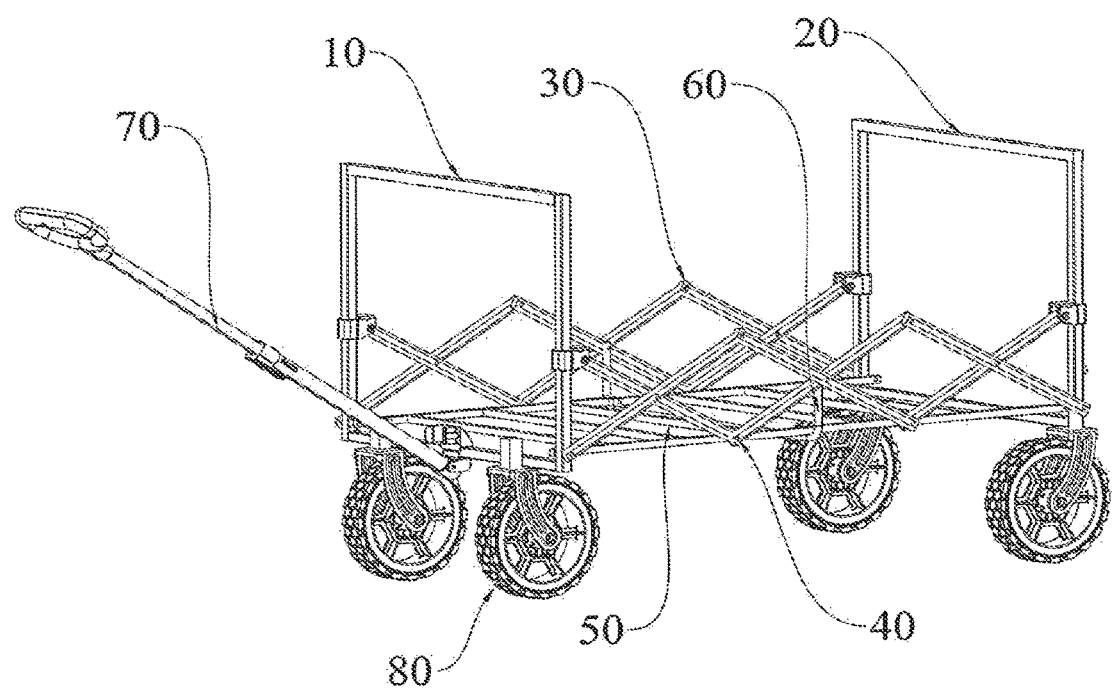
FIG. 1 is a structural diagram of a folding cart of the present disclosure.

As shown in FIG. 1, the present disclosure provides a folding cart. The overall volume of the cart is reduced by folding, thereby facilitating carrying and storage by a user. The folding cart includes first frame assembly 10, second frame assembly 20, first folding assembly 30, second folding assembly 40, and bottom support assembly 50. The first frame assembly 10 and the second frame assembly 20 have the same structure and shape, and are arranged oppositely. The first folding assembly 30 and the second folding assembly 40 have the same structure and shape, and are arranged oppositely. A first end of the first folding assembly 30 is connected to a first side edge of the first frame assembly 10, a first end of the second folding assembly 40 is connected to a second side edge of the first frame assembly 10, and the first side edge and the second side edge of the first frame assembly 10 are a group of opposite side edges. A second end of the first folding assembly 30 is connected to a first side edge of the second frame assembly 20, a second end of the second folding assembly 40 is connected to a second side edge of the second frame assembly 20, and the first side edge and the second side edge of the second frame assembly 20 are a group of opposite side edges. Two ends of the bottom support assembly 50 are connected to the first frame assembly 10 and the second frame assembly 20 in one-to-one correspondence. The first folding assembly 30 and the second folding assembly 40 can be switched between a first state and a second state by stretching and folding. The folding cart is simple in structure and convenient to operate, and effectively improves user experience.

Figure 3:
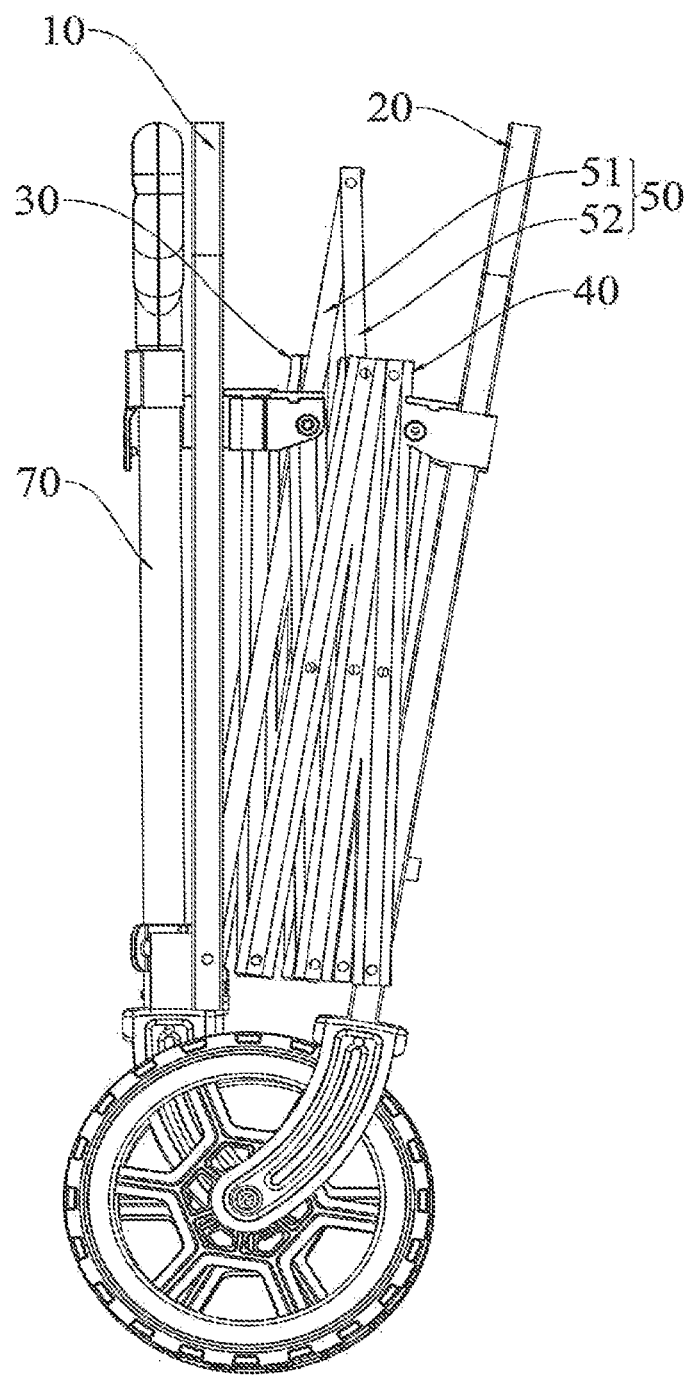
FIG. 3 is a front view of a folding cart of the present disclosure in a folded state.

As shown in FIG. 3, the first state is a folded state. In this state, the first frame assembly 10 and the second frame assembly 20 are close to each other, such that the first folding assembly 30 and the second folding assembly 40 are both folded and compressed between the first frame assembly 10 and the second frame assembly 20, and the bottom support assembly 50 is folded between the first frame assembly 10 and the second frame assembly 20, thereby reducing the volume of the cart. Height values of the bottom support assembly 50, the first folding assembly 30, and the second folding assembly 40 are all smaller than or equal to a height value of the first frame assembly 10 in this state, ensuring that the height of the folding cart in a storage state does not exceed the height of the first frame assembly 10. The folding cart has the same folding height and use height, thereby reducing the volume thereof in the folded state, and facilitating storage and carrying by a user.

Figure 4:
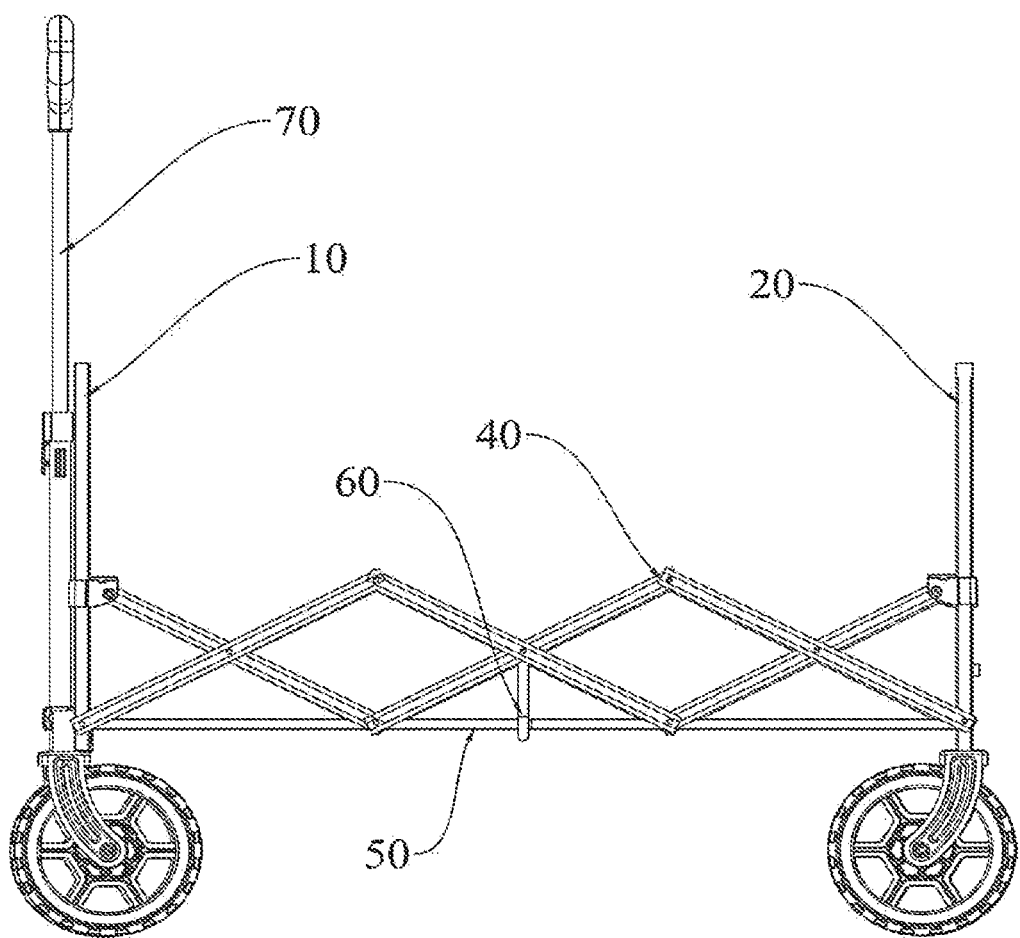
FIG. 4 is a front view of a folding cart of the present disclosure in a use state.

As shown in FIG. 4, the second state is a use state. In this state, the first frame assembly 10 and the second frame assembly 20 are away from each other, and the bottom support assembly 50, the first folding assembly 30, and the second folding assembly 40 are all stretched and supported between the first frame assembly 10 and the second frame assembly 20. At this time, the first frame assembly 10 and the second frame assembly 20 are vertically arranged and parallel to each other. By connecting the first frame assembly 10, the first folding assembly 30, the second frame assembly 20, and the second folding assembly 40 into a cart frame, the volume of the cart is effectively increased, and the placement of more articles is facilitated.

In addition, as shown in FIG. 4, the cart is in a half-folded state, and the half-folded state is an intermediate state between the first state and the second state.

Figure 2:
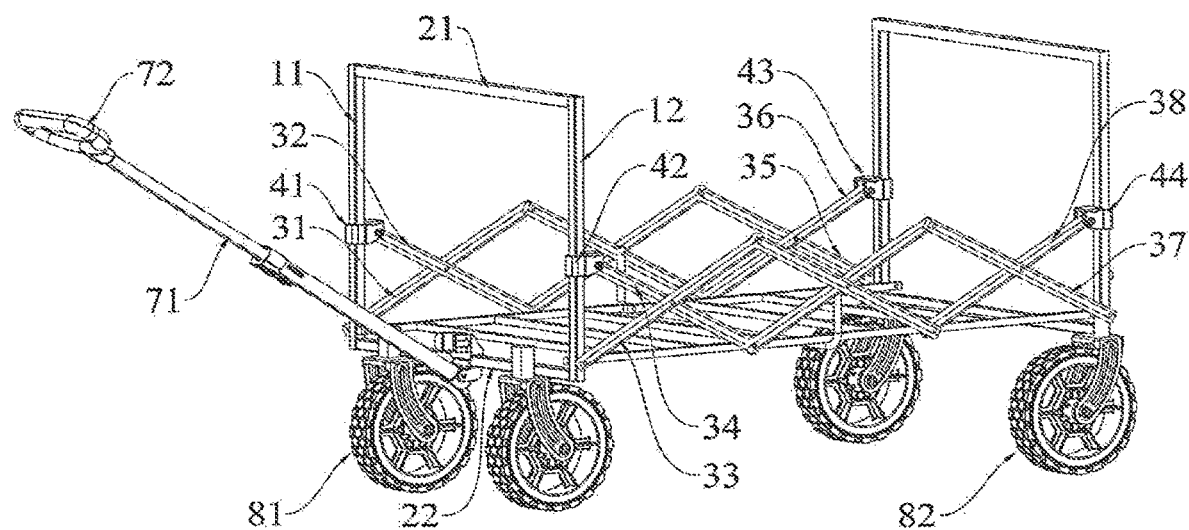
FIG. 2 is a stereoscopic diagram of a folding cart of the present disclosure in a use state.

As shown in FIG. 2, the first frame assembly 10 and the second frame assembly 20 each include first vertical bar 11, second vertical bar 12, first cross bar 21, and second cross bar 22. A first end of the first vertical bar 11 is vertically connected to a first end of the first cross bar 21, a second end of the first cross bar 21 is vertically connected to a first end of the second vertical bar 12, a second end of the second vertical bar 12 is vertically connected to a second end of the second cross bar 22, and a first end of the second cross bar 22 is vertically connected to a second end of the first vertical bar 11. The first frame assembly 10 and the second frame assembly 20 are both rectangular frames having square and beautiful structures. Two ends of the first folding assembly 30 are connected to the first vertical bars 11 of the first frame assembly 10 and the second frame assembly 20 in one-to-one correspondence to form a first side surface of the folding cart. Two ends of the second folding assembly 40 are connected to the second vertical bars 12 of the first frame assembly 10 and the second frame assembly 20 in one-to-one correspondence, and upper end parts of the first folding assembly 30 and the second folding assembly 40 connected to the first vertical bars 11 and the second vertical bars 12 are slidably connected to the vertical bars to form a second side surface of the folding cart. The folding cart is basically a hollow cuboid or cube in the use state, which is convenient for storing and organizing articles in the cart.

Furthermore, as shown in FIG. 2, the first folding assembly 30 and the second folding assembly 40 each include a first scissor linkage, a second scissor linkage, and a third scissor linkage. The first scissor linkage, the third scissor linkage, and the second scissor linkage are hinged in sequence, thereby ensuring that the first folding assembly 30 and the second folding assembly 40 have an enough length in the second state to increase the volume of the cart while simplifying the structures of the first folding assembly 30 and the second folding assembly 40. The length of the first folding assembly 30 and the second folding assembly 40 in the second state is increased by increasing the number of the third scissor linkages, which can increase the volume of the cart. However, after the cart is folded, because the scissor linkages are stacked together, the width of the cart after folding is too large, which increases the volume of the cart after being folded. If both the first folding assembly 30 and the second folding assembly 40 use two scissor linkages, on the premise of ensuring the volume in the second state, the height of two scissor linkages in the folded state may exceed the height of the frame assemblies, thereby increasing the overall height of the cart in the folded state. Therefore, the present disclosure selects three scissor linkages as the folding assemblies, which can not only ensure sufficient volume of the cart in the second state, but also make the cart have a smaller volume in the first state, which facilitates storage and carrying by a user. Specifically, the first scissor linkage of the first folding assembly 30 includes first linkage 31 and second linkage 32, of which middle positions are rotatably connected to each other; the first scissor linkage of the second folding assembly 40 includes third linkage 33 and fourth linkage 34, of which middle positions are rotatably connected to each other; the second scissor linkage of the first folding assembly 30 includes fifth linkage 35 and sixth linkage 36, of which middle positions are rotatably connected to each other; and the second scissor linkage of the second folding assembly 40 includes seventh linkage 37 and eighth linkage 38, of which middle positions are rotatably connected to each other. The first linkage 31 is hinged to the first vertical bar 11 of the first frame assembly 10, a hinged joint is close to a lower end of the first vertical bar 11 of the first frame assembly 10, and the second linkage 32 is slidably connected to the first vertical bar 11 of the first frame assembly 10. The third linkage 33 is hinged to the second vertical bar 12 of the first frame assembly 10, a hinged joint is close to a lower end of the second vertical bar 12 of the first frame assembly 10, and the fourth linkage 34 is slidably connected to the second vertical bar 12 of the first frame assembly 10. The fifth linkage 35 is hinged to the first vertical bar 11 of the second frame assembly 20, a hinged joint is close to a lower end of the first vertical bar 11 of the second frame assembly 20, and the sixth linkage 36 is slidably connected to the first vertical bar 11 of the second frame assembly 20. The seventh linkage 37 is hinged to the second vertical bar 12 of the second frame assembly 20, a hinged joint is close to a lower end of the second vertical bar 12 of the second frame assembly 20, and the eighth linkage 38 is slidably connected to the second vertical bar 12 of the second frame assembly 20.

As shown in FIG. 2 to FIG. 5, first slide sleeve 41 is slidably sleeved on the first vertical bar 11 of the first frame assembly 10, second slide sleeve 42 is slidably sleeved on the second vertical bar 12 of the first frame assembly 10, third slide sleeve 43 is slidably sleeved on the first vertical bar 11 of the second frame assembly 20, and fourth slide sleeve 44 is slidably sleeved on the second vertical bar 12 of the second frame assembly 20. The second linkage 32 is hinged to the first slide sleeve 41, the fourth linkage 34 is hinged to the second slide sleeve 42, the sixth linkage 36 is hinged to the third slide sleeve 43, and the eighth linkage 38 is hinged to the fourth slide sleeve 44. When the first folding assembly 30 and the second folding assembly 40 are compressed, the slide sleeves slide upward on the vertical bars. The use of the slide sleeve structures improves the smoothness of operations.

Figure 5:
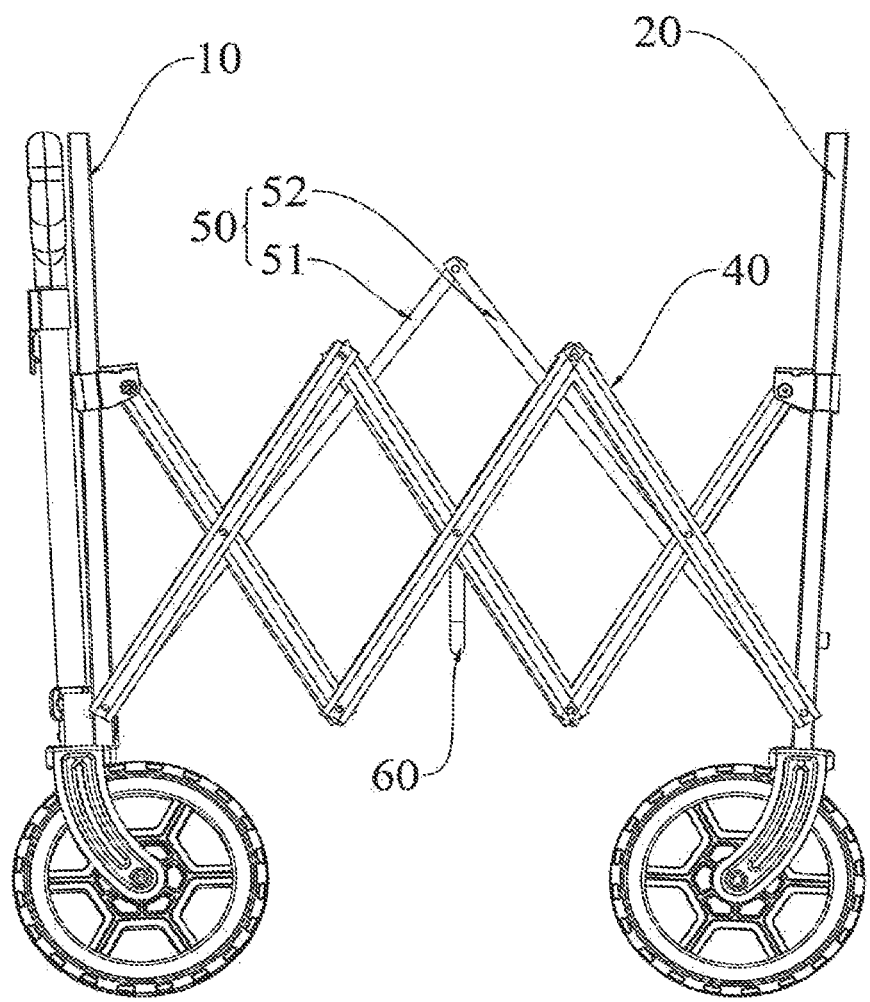
FIG. 5 is a front view of a folding cart of the present disclosure in a half-folded state.
Figure 6:
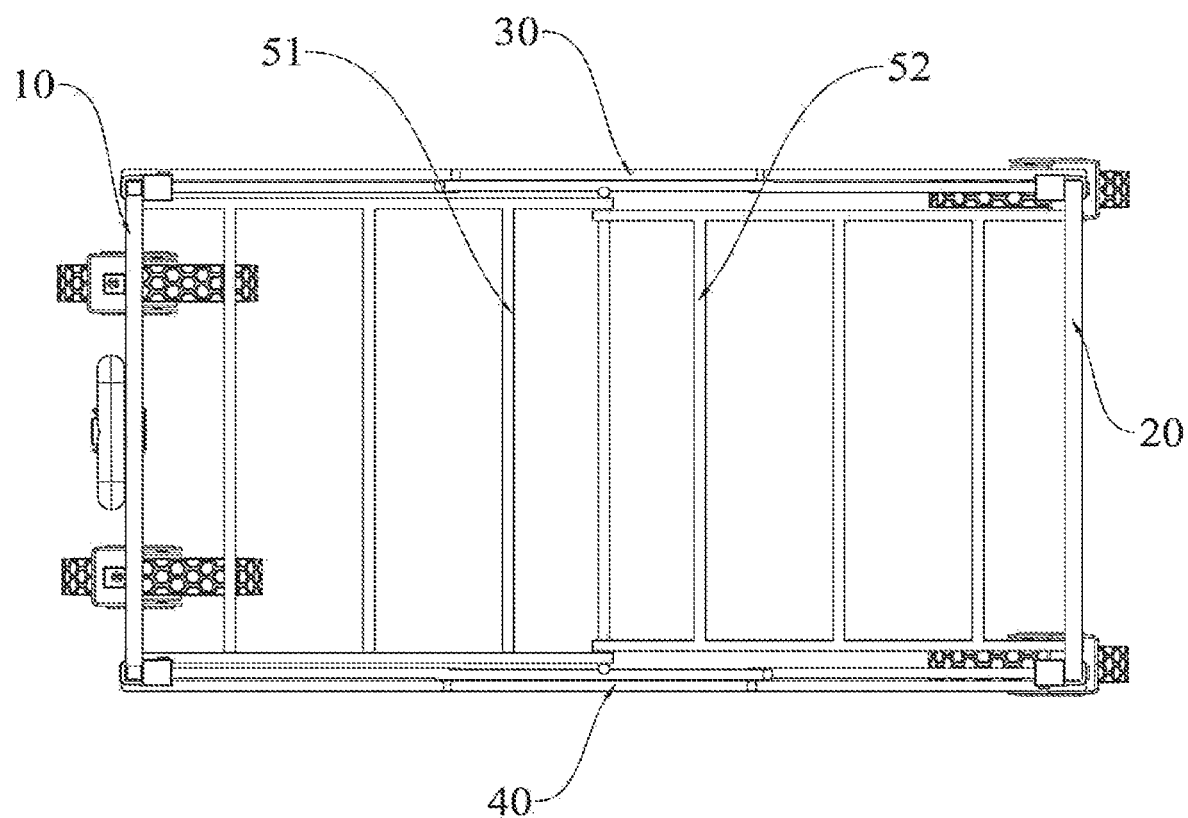
FIG. 6 is a top view of a folding cart of the present disclosure in a use state.

As shown in FIG. 6, the bottom support assembly 50 includes first bottom frame 51 and second bottom frame 52. The first bottom frame 51 and the second bottom frame 52 each include a group of opposite frames and a plurality of connecting rods arranged at intervals between the two frames, so as to form a hollowed bottom frame. First ends of the two frames of the first bottom frame 51 are rotatably connected to the two vertical bars of the first frame assembly 10 by means of a rotating shaft, rotatable connecting points and a connecting point of the first scissor linkage on the first frame assembly 10 are the same, and one rotating shaft is shared, thereby simplifying the connecting structure. Second ends of the two frames of the first bottom frame 51 are rotatably connected to first ends of the two frames of the second bottom frame 52 by means of a rotating shaft, second ends of the two frames of the second bottom frame 52 are rotatably connected to the two vertical bars of the second frame assembly 20 by means of a rotating shaft, rotatable connecting points and a connecting point of the second scissor linkage on the second frame assembly 20 are the same, and one rotating shaft is shared, thereby simplifying the connecting structure. As shown in FIG. 3 and FIG. 5, in the first state, the first bottom frame 51 and the second bottom frame 52 are upward folded and compressed between the first frame assembly 10 and the second frame assembly 20, and the height of the first bottom frame 51 and the second bottom frame 52 after folding is smaller than or equal to the heights of the first frame assembly 10 and the second frame assembly 20 in this state. As shown in FIG. 4, in the second state, the first bottom frame 51 and the second bottom frame 52 are unfolded and supported between the first frame assembly 10 and the second frame assembly 20, ensuring that the first bottom frame 51 and the second bottom frame 52 are located within a same plane.

As shown in FIG. 2, the folding cart further includes U-shaped boom 60. A middle of the U-shaped boom 60 is located just below a rotatable connecting point between the first bottom frame 51 and the second bottom frame 52, an opening of the U-shaped boom 60 is arranged upward, a first end of the U-shaped boom 60 is hinged to a hinged joint of the third scissor linkage of the first folding assembly 30, and a second end of the U-shaped boom 60 is hinged to a hinged joint of the third scissor linkage of the second folding assembly 40. In the second state, the first bottom frame 51 and the second bottom frame 52 both abut against the U-shaped boom 60, such that the first bottom frame 51 and the second bottom frame 52 are supported, the first bottom frame 51 and the second bottom frame 52 are ensured to be located within a same plane, and the bearing capability of the first bottom frame 51 and the second bottom frame 52 in the second state can also be improved.

As shown in FIG. 2 and FIG. 3, the folding cart further includes handle assembly 70. The handle assembly 70 includes telescopic rod 71 and pull ring 72. An end of the telescopic rod 71 is rotatably connected to the second cross bar 22 of the first frame assembly 10, and the pull ring 72 is connected to a second end of the telescopic rod 71. In the second state, the telescopic rod 71 is elongated and rotated to leave away from the first frame assembly 10, thereby facilitating use by a user. In the first state, the telescopic rod 71 shrinks and leans against the first frame assembly 10, and the height thereof is smaller than or equal to the heights of the first frame assembly 10 and the second frame assembly 20 in this state.

Figure 7:
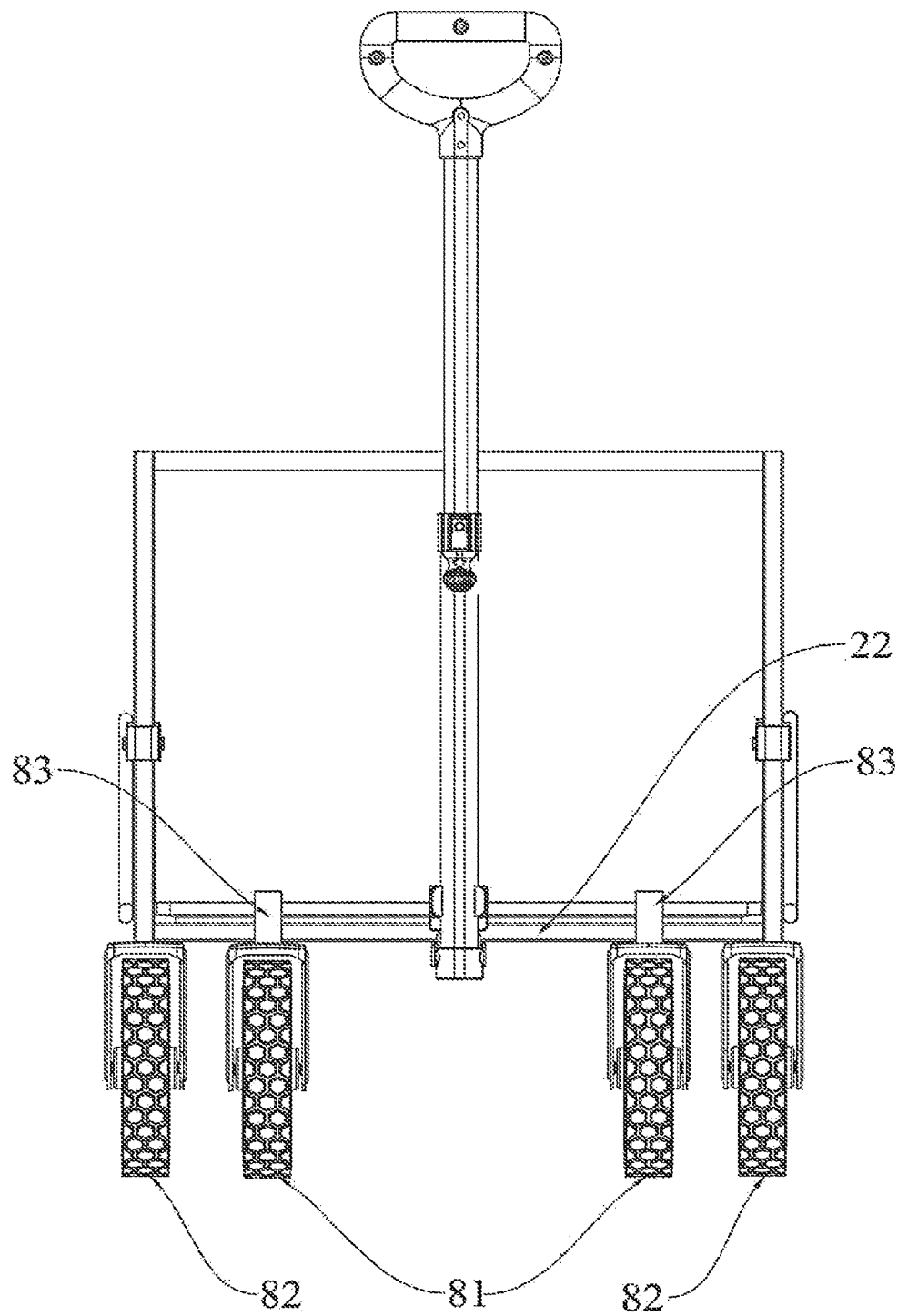
FIG. 7 is a left view of a folding cart of the present disclosure in a folded state.

As shown in FIG. 2, a plurality of wheel assemblies 80 are connected to the first frame assembly 10 and the second frame assembly 20, such that the cart moves conveniently. Specifically, two first wheel assemblies 80 are provided on the first frame assembly 10, and two second wheel assemblies 80 are provided on the second frame assembly 20. With reference to FIG. 7, the first wheel assemblies 80 each include universal shaft 83 and first roller 81. The universal shaft 83 is rotatably arranged on the second cross bar 22 of the first frame assembly 10, is arranged vertically, and can rotate around its own axle. The first roller 81 is connected to the lower end of the universal shaft 83 by means of a wheel fork. The second wheel assemblies 80 are second rollers 82 connected to the lower surface of the second cross bar 22 of the second frame assembly 20 by means of wheel forks.

Figure 8:
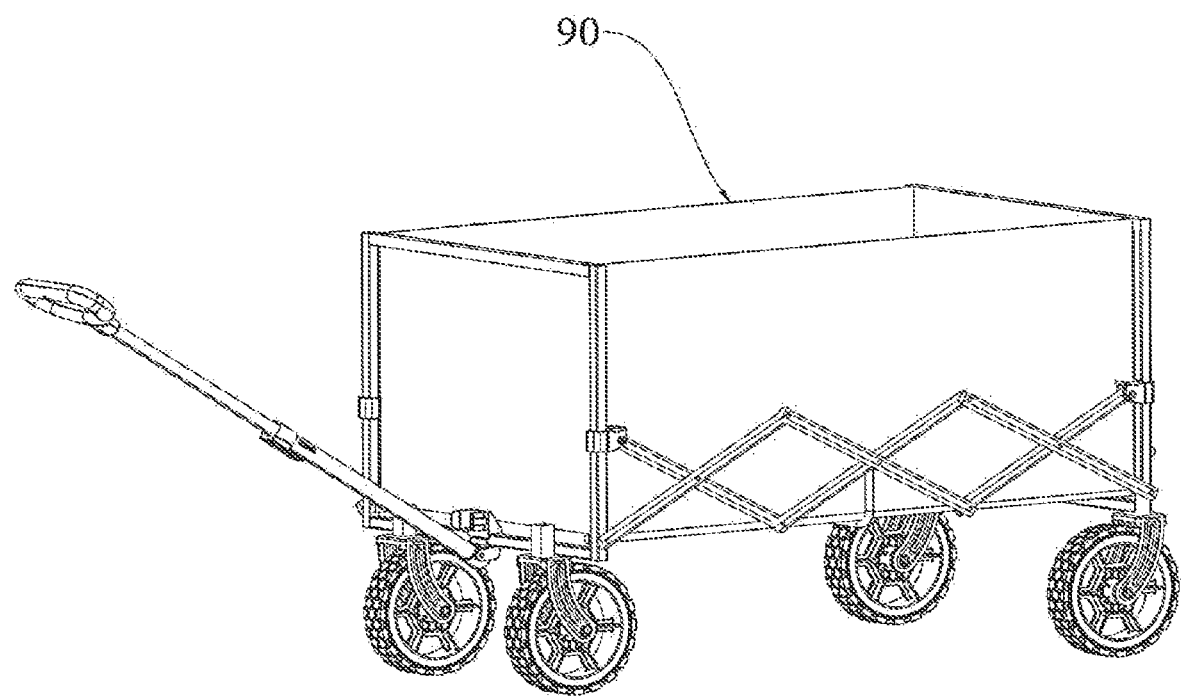
FIG. 8 is a structural diagram of a cloth container of a folding cart of the present disclosure.

In addition, the folding cart further includes cloth container 90. The cloth container 90 is sleeved on a skeleton formed by the first frame assembly 10, the second frame assembly 20, the first folding assembly 30, and the second folding assembly 40. The first frame assembly 10 and the second frame assembly 20 are both connected to the cloth container 90. In one implementation, as shown in FIG. 8, the cloth container 90 is mounted within the skeleton, with an opening upward. The cloth container 90 is supported by the skeleton, and articles are placed in the cloth container 90. In another implementation, the cloth container 90 wraps the skeleton, the skeleton is located inside the cloth container 90, and the articles are placed on the skeleton The two implementations both fall within the scope of the present disclosure.

Before folding, the connection point between the first bottom frame 51 and the second bottom frame 52 is lifted up first, and the first bottom frame 51 and the second bottom frame 52 move upward around a common rotation point, which is the half-folded state in FIG. 5. The first linkage 31 and the third linkage 33 respectively rotate and retract with the first vertical bar 11 and the second vertical bar 12 of the first frame assembly 10 around their respective rotation points. The fifth linkage 35 and the seventh linkage 37 respectively rotate and retract with the first vertical bar 11 and the second vertical bar 12 of the second frame assembly 20 around their respective rotation points. The third scissor linkages rotate and retract around their respective rotation points. Moreover, an end of the second linkage 32 slides upward to be folded on the first vertical bar 11 of the first slide sleeve 41 by means of the common rotation point, and an end of the fourth linkage 34 slides upward to be folded on the second vertical bar 12 of the second slide sleeve 42 by means of the common rotation point. The second scissor linkages also drive the slide sleeves to move. Under the driving of linked folding of the bottom frames, the first frame assembly 10 and the second frame assembly 20 are close to each other to implement folding, so as to finally achieve a side folded state as shown in FIG. 3.

The first state in the present disclosure is a folded state. In this state, the first folding assembly 30 and the second folding assembly 40 are both folded and compressed between the first frame assembly 10 and the second frame assembly 20, and the first frame assembly 10 and the second frame assembly 20 are close to each other. The heights of the first folding assembly 30 and the second folding assembly 40 are smaller than or equal to the height of the first frame assembly 10, ensuring that the height of the folding cart in a storage state does not exceed the height of the first frame assembly 10. The folding cart has the same folding height and use height, thereby reducing the volume thereof in the folded state, and facilitating storage and carrying by a user. The second state is a use state. In this state, the first folding assembly 30 and the second folding assembly 40 are both stretched and supported between the first frame assembly 10 and the second frame assembly 20, and the first frame assembly 10 and the second frame assembly 20 are away from each other. At this time, the first frame assembly 10 and the second frame assembly 20 are vertically arranged and parallel to each other. By connecting the first frame assembly 10, the first folding assembly 30, the second frame assembly 20, and the second folding assembly 40 into a cart frame, the volume of the cart is effectively increased, and the placement of more articles is facilitated. As shown in FIG. 5, the cart is in a half-folded state, and the half-folded state is an intermediate state between the first state and the second state.

It should be understood that in the description of the present disclosure, terms such as "first" and "second" are used merely for a descriptive purpose, and should not be construed as indicating or implying relative importance, or implicitly indicating the number of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified, the terms such as "mounting", "interconnection", "connection" and "fixation" are intended to be understood in a broad sense. For example, the "connection" may be a fixed connection, removable connection or integral connection; may be a mechanical connection or electrical connection; may be a direct connection or indirect connection using a medium; and may be a communication or interaction between two elements. Those of ordinary skill in the art may understand specific meanings of the above terms in the present disclosure based on a specific situation.

In the present disclosure, unless otherwise explicitly specified, when it is described that a first feature is "above" or "below" a second feature, it indicates that the first and second features are in direct contact or the first and second features are in indirect contact through an intermediate feature. In addition, when it is described that the first feature is "over", "above" and "on" the second feature, it indicates that the first feature is directly or obliquely above the second feature, or simply indicates that an altitude of the first feature is higher than that of the second feature. When it is described that a first feature is "under", "below" or "beneath" a second feature, it indicates that the first feature is directly or obliquely under the second feature or simply indicates that the first feature is lower than the second feature.

In the description of this specification, the description with reference to the terms such as "one embodiment", "some embodiments", "example", "specific example" or "some examples" means that specific features, structures, materials or characteristics described in connection with the embodiment or example are included in at least one embodiment or example of the present disclosure. In this specification, schematic representation of the above terms is not necessarily directed to the same embodiment or example. Moreover, the specific features, structures, materials or characteristics described may be combined in a suitable manner in any one or more embodiments or examples. In addition, those skilled in the art may combine different embodiments or examples described in this specification and characteristics of the different embodiments or examples without mutual contradiction.

Although the embodiments of the present disclosure are illustrated above, it should be understood that the above embodiments are merely illustrative and may not be construed as limiting the scope of the present disclosure. Changes, modifications, substitutions and variations may be made to the above embodiments by a person of ordinary skill in the art within the scope of the present disclosure.

What is claimed is:

1. A folding cart, wherein the folding cart comprises a first frame assembly, a second frame assembly, a first folding assembly, a second folding assembly, and a bottom support assembly;
   the first frame assembly and the second frame assembly are arranged oppositely, a first end of the first folding assembly and a first end of the second folding assembly are connected to the first frame assembly, a second end of the first folding assembly and a second end of the second folding assembly are connected to the second frame assembly, and two ends of the bottom support assembly are connected to the first frame assembly and the second frame assembly in one-to-one correspondence;
   the first folding assembly and the second folding assembly are allowed to be switched between a first state and a second state;
   in the first state, the first frame assembly and the second frame assembly are adjacent to each other, the first folding assembly and the second folding assembly are folded and compressed between the first frame assembly and the second frame assembly, the bottom support assembly is folded between the first frame assembly and the second frame assembly, and heights of the bottom support assembly, the first folding assembly, and the second folding assembly are smaller than or equal to heights of the first frame assembly and the second frame assembly;

in the second state, the first frame assembly and the second frame assembly are away from each other, and the first folding assembly, the second folding assembly, and the bottom support assembly are stretched and supported between the first frame assembly and the second frame assembly;

the first frame assembly and the second frame assembly each comprise a first vertical bar, a second vertical bar, a first cross bar, and a second cross bar;

a first end of the first vertical bar is vertically connected to a first end of the first cross bar, a second end of the first cross bar is vertically connected to a first end of the second vertical bar, a second end of the second vertical bar is vertically connected to a second end of the second cross bar, and a first end of the second cross bar is vertically connected to a second end of the first vertical bar;

two ends of the first folding assembly are connected to the first vertical bars of the first frame assembly and the second frame assembly in one-to-one correspondence, two ends of the second folding assembly are connected to the second vertical bars of the first frame assembly and the second frame assembly in one-to-one correspondence, and upper end parts of the first folding assembly and the second folding assembly connected to the first vertical bars and the second vertical bars are slidably connected to the first and second vertical bars;

the first folding assembly and the second folding assembly each comprise a first scissor linkage, a third scissor linkage, and a second scissor linkage hinged in sequence;

the first scissor linkage of the first folding assembly comprises a first linkage and a second linkage, and the first scissor linkage of the second folding assembly comprises a third linkage and a fourth linkage;

the second scissor linkage of the first folding assembly comprises a fifth linkage and a sixth linkage, and the second scissor linkage of the second folding assembly comprises a seventh linkage and an eighth linkage;

the first linkage is hinged to the first vertical bar of the first frame assembly, a first hinged joint is adjacent to a lower end of the first vertical bar of the first frame assembly, and the second linkage is slidably connected to the first vertical bar of the first frame assembly;

the third linkage is hinged to the second vertical bar of the first frame assembly, a second hinged joint is adjacent to a lower end of the second vertical bar of the first frame assembly, and the fourth linkage is slidably connected to the second vertical bar of the first frame assembly;

the fifth linkage is hinged to the first vertical bar of the second frame assembly, a third hinged joint is adjacent to a lower end of the first vertical bar of the second frame assembly, and the sixth linkage is slidably connected to the first vertical bar of the second frame assembly; and the seventh linkage is hinged to the second vertical bar of the second frame assembly, a fourth hinged joint is adjacent to a lower end of the second vertical bar of the second frame assembly, and the eighth linkage is slidably connected to the second vertical bar of the second frame assembly:

a first slide sleeve is slidably sleeved on the first vertical bar of the first frame assembly, a second slide sleeve is slidably sleeved on the second vertical bar of the first frame assembly, a third slide sleeve is slidably sleeved on the first vertical bar of the second frame assembly, and a fourth slide sleeve is slidably sleeved on the second vertical bar of the second frame assembly; and the second linkage is hinged to the first slide sleeve, the fourth linkage is hinged to the second slide sleeve, the sixth linkage is hinged to the third slide sleeve, and the eighth linkage is hinged to the fourth slide sleeve.

2. The folding cart according to claim 1, wherein the bottom support assembly comprises a first bottom frame and a second bottom frame, the first bottom frame is provided with a first side rotatably connected to the first frame assembly and a second side rotatably connected to a first side of the second bottom frame, a second side of the second bottom frame is rotatably connected to the second frame assembly, the first side and the second side of the first bottom frame are opposite to each other, and the first side and the second side of the second bottom frame are opposite to each other;

in the first state, the first bottom frame and the second bottom frame are folded between the first frame assembly and the second frame assembly, and heights of the first bottom frame and the second bottom frame are smaller than or equal to the heights of the first frame assembly and the second frame assembly; and in the second state, the first bottom frame and the second bottom frame are unfolded and supported between the first frame assembly and the second frame assembly, and the first bottom frame and the second bottom frame are located within a same plane.

3. The folding cart according to claim 1, wherein the folding cart further comprises a handle assembly, the handle assembly comprises a telescopic rod and a pull ring, a first end of the telescopic rod is rotatably connected to the first frame assembly, and the pull ring is connected to a second end of the telescopic rod; and in the first state, the handle assembly is allowed to shrink back to have a height smaller than or equal to the heights of the first frame assembly and the second frame assembly.

4. The folding cart according to claim 1, wherein a plurality of wheel assemblies are connected to the first frame assembly and the second frame assembly.

5. The folding cart according to claim 4, wherein two first wheel assemblies are provided on the first frame assembly, and two second wheel assemblies are provided on the second frame assembly;

the first wheel assemblies each comprise a universal shaft and a first roller, the universal shaft is rotatably arranged on the first frame assembly, and the first roller is connected to the universal shaft by means of a wheel fork; and the second wheel assemblies are second rollers connected to the second frame assembly by means of wheel forks.

6. The folding cart according to claim 1, wherein the folding cart further comprises a cloth container;

the cloth container is sleeved on the first frame assembly, the second frame assembly, the first folding assembly, and the second folding assembly, and the first frame assembly and the second frame assembly are connected to the cloth container.

7. A folding cart, wherein the folding cart comprises a first frame assembly, a second frame assembly, a first folding assembly, a second folding assembly, and a bottom support assembly;
- the first frame assembly and the second frame assembly are arranged oppositely, a first end of the first folding assembly and a first end of the second folding assembly are connected to the first frame assembly, a second end of the first folding assembly and a second end of the second folding assembly are connected to the second frame assembly, and two ends of the bottom support assembly are connected to the first frame assembly and the second frame assembly in one-to-one correspondence;
- the first folding assembly and the second folding assembly are allowed to be switched between a first state and a second state;
- in the first state, the first frame assembly and the second frame assembly are adjacent to each other, the first folding assembly and the second folding assembly are folded and compressed between the first frame assembly and the second frame assembly, the bottom support assembly is folded between the first frame assembly and the second frame assembly, and heights of the bottom support assembly, the first folding assembly, and the second folding assembly are smaller than or equal to heights of the first frame assembly and the second frame assembly;
- in the second state, the first frame assembly and the second frame assembly are away from each other, and the first folding assembly, the second folding assembly, and the bottom support assembly are stretched and supported between the first frame assembly and the second frame assembly;
- the bottom support assembly comprises a first bottom frame and a second bottom frame, the first bottom frame is provided with a first side rotatably connected to the first frame assembly and a second side rotatably connected to a first side of the second bottom frame, a second side of the second bottom frame is rotatably connected to the second frame assembly, the first side and the second side of the first bottom frame are opposite to each other, and the first side and the second side of the second bottom frame are opposite to each other;
- in the first state, the first bottom frame and the second bottom frame are folded between the first frame assembly and the second frame assembly, and heights of the first bottom frame and the second bottom frame are smaller than or equal to the heights of the first frame assembly and the second frame assembly;
- in the second state, the first bottom frame and the second bottom frame are unfolded and supported between the first frame assembly and the second frame assembly, and the first bottom frame and the second bottom frame are located within a same plane;
- the folding cart further comprises a U-shaped boom, a middle of the U-shaped boom is located below a connection point between the first bottom frame and the second bottom frame, a first end of the U-shaped boom is hinged to the first folding assembly, and a second end of the U-shaped boom is hinged to the second folding assembly; and
- in the second state, the first bottom frame and the second bottom frame abut against the U-shaped boom.

* * * * *